United States Patent
Smyth et al.

(10) Patent No.: US 10,264,009 B2
(45) Date of Patent: Apr. 16, 2019

(54) AUTOMATED MACHINE LEARNING SCHEME FOR SOFTWARE EXPLOIT PREDICTION

(71) Applicant: Booz Allen Hamilton Inc., McLeane, VA (US)

(72) Inventors: Eric Smyth, Redwood City, CA (US); Aaron Sant-Miller, Arlington, VA (US); Kevin Field, Seattle, WA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 267 days.

(21) Appl. No.: 15/219,713

(22) Filed: Jul. 26, 2016

(65) Prior Publication Data
US 2018/0034842 A1    Feb. 1, 2018

(51) Int. Cl.
| | | |
|---|---|---|
| H04L 29/06 | (2006.01) | |
| G06N 20/00 | (2019.01) | |
| G06N 7/00 | (2006.01) | |
| G06N 99/00 | (2019.01) | |
| G06F 21/57 | (2013.01) | |
| G06F 21/55 | (2013.01) | |

(52) U.S. Cl.
CPC ........ H04L 63/1433 (2013.01); G06F 21/552 (2013.01); G06F 21/577 (2013.01); G06N 7/005 (2013.01); G06N 20/00 (2019.01); G06N 99/005 (2013.01)

(58) Field of Classification Search
CPC ............................ H04L 63/1433; G06N 7/005
USPC ......................................................... 726/25
See application file for complete search history.

(56) References Cited

U.S. PATENT DOCUMENTS

| | | | |
|---|---|---|---|
| 8,789,172 B2* | 7/2014 | Stolfo | G06F 21/56 380/280 |
| 9,690,933 B1* | 6/2017 | Singh | G06F 21/56 |
| 2006/0028556 A1* | 2/2006 | Bunn | G10L 15/25 348/211.99 |
| 2007/0226796 A1* | 9/2007 | Gilbert | G06F 21/55 726/22 |
| 2010/0064368 A1* | 3/2010 | Stolfo | G06F 21/564 726/24 |
| 2011/0167493 A1* | 7/2011 | Song | H04L 63/1416 726/23 |
| 2015/0332054 A1* | 11/2015 | Eck | H04L 63/1433 726/25 |
| 2016/0142429 A1* | 5/2016 | Renteria | H04L 63/1416 726/23 |
| 2017/0046518 A1* | 2/2017 | Chen | G06F 21/54 |
| 2017/0208085 A1* | 7/2017 | Steelman | H04L 63/1433 |
| 2017/0214708 A1* | 7/2017 | Gukal | H04L 63/1433 |

* cited by examiner

*Primary Examiner* — Jason K Gee
*Assistant Examiner* — Dereena T Cattunal
(74) *Attorney, Agent, or Firm* — Buchanan Ingersoll & Rooney PC (57) ABSTRACT

A predictive engine for analyzing existing vulnerability information to determine the likelihood of a vulnerability being exploited by malicious actors against a particular computer or network of computers. The predictive engine relies on multiple data sources providing historical vulnerability information, a plurality of predictive models, and periodic retraining of the prediction ensemble utilizing predictive models. Modeling schemes may also be used when retraining the predictive models forming the prediction ensemble.

18 Claims, 7 Drawing Sheets

National Cyber Awareness System

Vulnerability Summary for CVE-2016-3963

Original release date: 04/08/2016
Last revised: 04/11/2016
Source: US-CERT/NIST

Overview

Siemens SCALANCE S613 allows remote attackers to cause a denial of service (web-server outage) via traffic to TCP port 443.

Impact

| CVSS Severity (version 3.0): | CVSS Severity (version 2.0): |
|---|---|
| CVSS v3 Base Score: 5.3 Medium | CVSS v2 Base Score: 5.0 MEDIUM |
| Vector: CVSS:3.0/AV:N/AC:L/PR:N/UI:N/S:U/C:N/I:N/A:L | Vector: (AV:N/AC:L/Au:N/C:N/I:N/A:P) (legend) |
| Impact Score: 1.4 | Impact Subscore: 2.9 |
| Exploitability Score: 3.9 | Exploitability Subscore: 10.0 |
| CVSS Version 3 Metrics: | CVSS Version 2 Metrics: |
| Attack Vector (AV): Network | Access Vector: Network exploitable |
| Attack Complexity (AC): Low | Access Complexity: Low |
| Privileges Required (PR): None | Authentication: Not required to exploit |
| User Interaction (UI): None | Impact Type: Allows disruption of service |
| Scope (S): Unchanged | |
| Confidentiality (C): None | |
| Integrity (I): None | |
| Availability (A): Low | |

References to Advisories, Solutions, and Tools

By selecting these links, you will be leaving NIST webspace. We have provided these links to other web sites because they may have information that would be of interest to you. No inferences should be drawn on account of other sites being referenced, or not, from this page. There may be other web sites that are more appropriate for your purpose. NIST does not necessarily endorse the views expressed, or concur with the facts presented on these sites. Further, NIST does not endorse any commercial products that may be mentioned on these sites. Please address comments about this page to nvd@nist.gov.

External Source: CONFIRM
Name: http://www.siemens.com/cert/pool/cert/siemens_security_advisory_ssa-751155.pdf
Hyperlink: http://www.siemens.com/cert/pool/cert/siemens_security_advisory_ssa-751155.pdf

Vulnerable software and versions

+ Configuration 1
  + OR
    * cpe:/h:siemens:scalance_s613

* Denotes Vulnerable Software
Changes related to vulnerability configurations

Technical Details

Vulnerability Type (View All)
Other (NVD-CWE-Other)
CVE Standard Vulnerability Entry http://cve.mitre.org/cgi-bin/cvename.cgi?name=CVE-2016-3963

AUTOMATED MACHINE LEARNING SCHEME FOR SOFTWARE EXPLOIT PREDICTION

FIELD

The present disclosure provides a predictive engine for analyzing existing vulnerability information to determine the likelihood of a vulnerability being exploited by malicious actors against a particular computer or network of computers.

BACKGROUND

While the increasing use of computers and networked computing systems has provided increases in productivity and efficiency, such increasing use of computer and network computer systems also exposes business processes, data, and other aspects to exploitation from malicious actors. These malicious actors may use vulnerabilities in existing software, hardware, or combinations of software and hardware for information exfiltration, insertion of false information or malware, or other operations compromising the integrity of computers and networked computer systems. Although known techniques have been developed to both decrease the number of vulnerabilities and also detect malicious actors, many of these known techniques such as antivirus schemes along with network and system intrusion detection systems require the malicious actor to utilize techniques that have been previously identified. This is because these known techniques rely on detecting the signatures of the behavior of the malicious actor or the signatures of any software being employed by the malicious actor. If a malicious actor uses a previously unknown series of techniques or software, known techniques will typically be unable to detect the malicious actor because a signature for the behavior or software have not yet been completed and distributed.

To help identify the techniques and vulnerabilities exploited by malicious actors, the common vulnerabilities and exposures (CVE) system was created to provide a reference-method for publicly known information-security vulnerabilities and exposures. CVE identifiers are unique identifiers assigned by a CVE Numbering Authority (CNA) so that correspondence, network security databases, and other tools related to the vulnerability may be easily referenced. A typical CVE entry includes a description, a list of URLs and other information related to the issue, and the date the entry was created.

To address this problem, antivirus companies have employed techniques such as heuristic analysis to identify the commands being used by software and determine if these commands are suspicious. These techniques do not, however, consider historical information regarding vulnerabilities to derive predictions from which future vulnerabilities may be prevented. Others have employed intrusion detection and prevention systems (IDPS) to monitor a network or a system for suspicious traffic or intrusions. An IDPS is typically deployed for observing and monitoring a network or system so that problems with security policies and existing threats may be identified. In some deployments, the IDPS notify administrators of important events, and may also deploy countermeasures against the attackers. An IDPS may monitor traffic at an important point within the network or important individual host devices on the network. An IDPS will typically use software signatures along with monitoring for statistical anomalies or violations of rules or policies to identify a possible intrusion. Noise in the sample, such as bad packets generated by a software bug and not an intrusion, may result in false positives from the IDPS. Additionally, the thresholds used for detecting anomalies statistically may become outdated as threats continue to evolve.

The inventors have observed, however, that existing threat information exists in the form of publicly available vulnerability databases, social media posts, discussions on technical forums, and other areas. This corpus of information is not, however, easily considered due to the disparate locations of the various types of information, along with the varying characterizations by multiple interested parties of a particular threat. A need therefore exists for a method of processing existing threat information in a manner that facilitates the generation of a threat level a particular threat.

There is therefore a need for the ability to consider existing or historical vulnerability information and determine the likelihood a new vulnerability may be exploited. This likelihood of exploitation information helps prioritize allocation of the limited available personnel and resources for securing a network or a system.

SUMMARY

Described herein is a method for providing a threat level based on a prediction of a likelihood that a current vulnerability may be employed in a customer computer network. The method comprises retrieving a prediction ensemble previously used by a prediction engine, where the prediction ensemble defines a combination of a plurality of prediction models and adjustments to be used by the prediction engine retraining the prediction ensemble previously used by the prediction engine, where the retraining evaluates a combined data set of historical vulnerability information and a modeling scheme to generate a revised prediction ensemble based on a plurality of prediction models, retrieving current vulnerability information describing a current vulnerability from the plurality of data sources, processing the current vulnerability information describing the current vulnerability for use by the prediction engine, generating, using the prediction engine, a prediction based on the revised prediction ensemble and the processed current vulnerability information, where the prediction identifies the likelihood that the current vulnerability may be employed in a customer computer network, and providing to an administrator of the customer computer network the threat level based on the prediction of the likelihood the current vulnerability may be employed in the customer computer network, where the threat level is based on predetermined thresholds defined by the administrator of the customer computer network.

The combined data set is generated by retrieving the historical vulnerability information from a plurality of data sources, indexing the historical vulnerability information, translating vulnerability descriptions from the historical vulnerability information into defined values, performing textual analysis to extract additional information from the historical vulnerability information, correlating the defined values, the additional information, and untranslated source information, and generating the combined data set based on the correlated defined values, additional information, and untranslated source information of the historical vulnerability information.

The processing of the current vulnerability information describing the current vulnerability for use by the prediction engine comprises indexing the current vulnerability information, translating vulnerability descriptions from the current vulnerability information into defined values, performing textual analysis to extract additional information, correlating the defined values, the additional information, and untranslated source information, and generating the processed current vulnerability information based on the correlated defined values, additional information, and untranslated source information of the current vulnerability information.

Generating the revised prediction ensemble based on the plurality of prediction models comprises receiving a modeling scheme containing adjustments to an existing prediction ensemble, and training the plurality of prediction models using a training set created from at least a portion of the combined data set and the modeling scheme to revise the prediction ensemble.

The training of the plurality of predictive models using the training set created from the portion of the combined data set and the modeling scheme includes splitting the combined data set into the training set and a testing set running the plurality of predictive models against the training set to generate training predictions running the plurality of predictive models against the testing set to generate testing predictions, and revising the prediction ensemble based on the generated training predictions and the generated testing predictions. The generation, using the prediction engine, of the prediction based on the revised prediction ensemble, and the processed current vulnerability information includes updating the prediction engine to use the revised prediction ensemble, and executing the prediction engine with the revised prediction ensemble of the plurality of predictive models against the processed current vulnerability information to obtain the prediction. The historical vulnerability information from the plurality of data sources includes a common identifier for each vulnerability, where the generated combined data set is correlated using the common identifier, and where the processed current vulnerability information includes a common identifier for the current vulnerability. The retraining of the prediction engine occurs periodically to consider new historical vulnerability information retrieved from the plurality of data sources. The generated prediction is based on a configuration of the customer computer network.

BRIEF DESCRIPTION OF THE DRAWINGS

FIG. 3 depicts an example vulnerability summary.

DETAILED DESCRIPTION

The system described herein employs a predictive engine 160 which analyzes vulnerability information to determine the likelihood of a current vulnerability being exploited by malicious actors against a particular computer or network of computers. To provide the information needed to train the models 531, 532, 533, 534 used by the predictive engine 160, historical information regarding vulnerabilities is needed.

Figure 1:
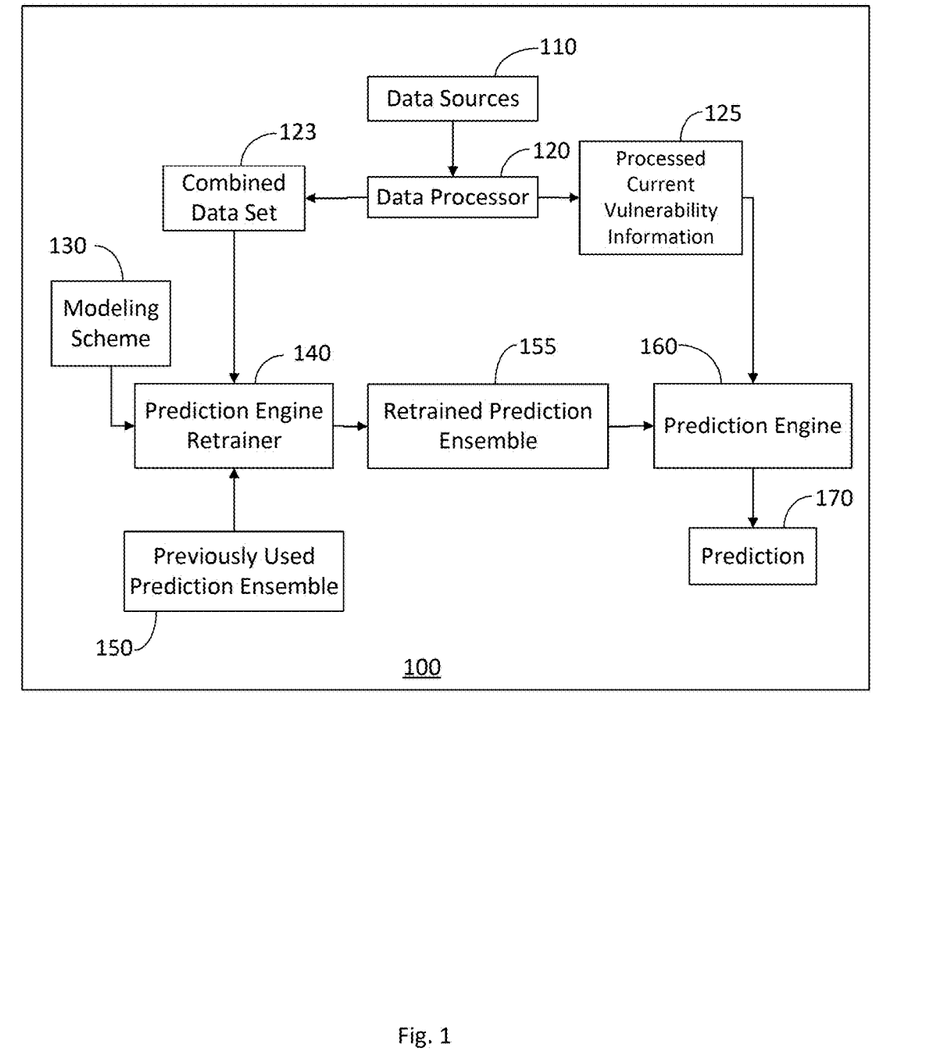
FIG. 1 depicts one embodiment of the method for predicting the likelihood of exploitation of system vulnerabilities.

FIG. 1 depicts one embodiment 100 of the method implemented by a computer system 700 that predicts the likelihood a current vulnerability may be exploited. As shown, data sources 110 provide both historical and current information that is processed by the data processor 120 into a format suitable for consumption by predictive models 531, 532, 533, 534. First, the data processor 120 creates a combined data set 123 of historical vulnerability information obtained from data sources 110 for the prediction engine retrainer 140 so that the predictive models 531, 532, 533, 534 may be trained against the historical information. The predictive models 521, 532, 533, 534 are combined into a prediction ensemble 155 for use by the prediction engine 160. In addition, a modeling scheme 130 and a previously used prediction ensemble 150 may be considered by the prediction engine retrainer 140 to generate a retrained prediction ensemble 155. In both scenarios, the prediction engine 160 adopts the prediction ensemble 155. Next, the data processor 120 creates processed current vulnerability information 125 by obtaining information about a current vulnerability from the data sources 110. The prediction engine 160 takes this processed current vulnerability information 125 and uses the prediction ensemble 155 from the prediction engine retrainer 140 to generate a prediction 170 of the likelihood the current vulnerability may be employed in a customer's computer network. This prediction may then be used to derive a threat level based on thresholds set by an administrator for the customer's computer network. This method 100 therefore provides an easily understood threat level for a current vulnerability based on historical vulnerability information.

Data Sources

Figure 2:
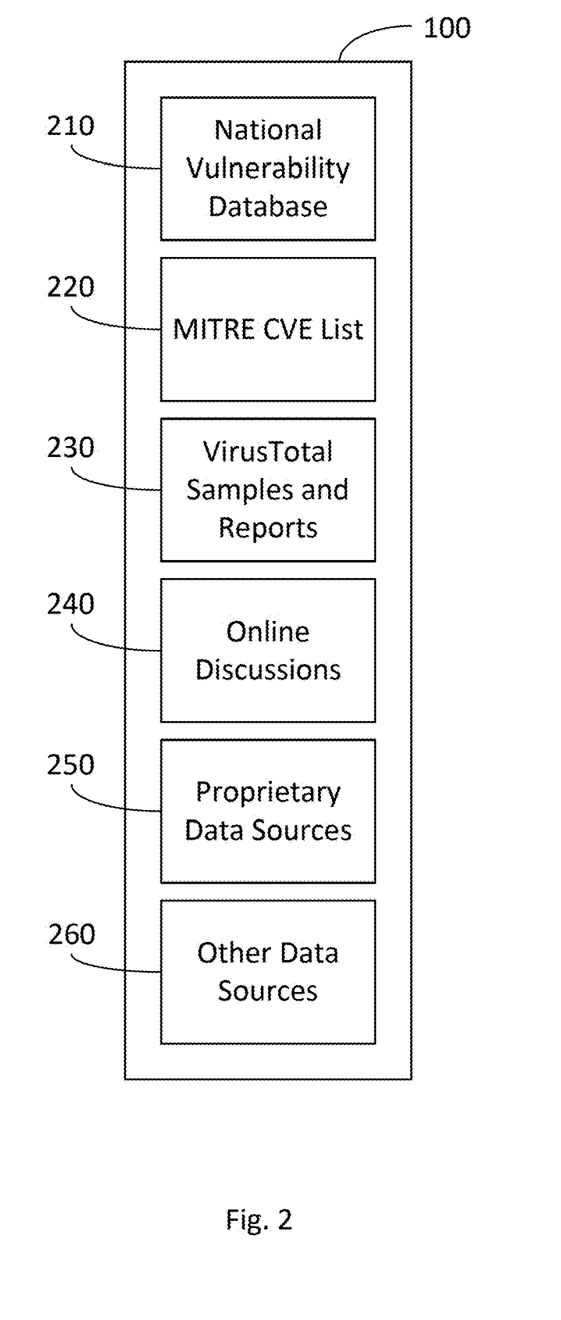
FIG. 2 depicts example data sources from which threat information is acquired.

Data sources 110 are repositories of information describing vulnerabilities that have been observed and characterized. The data sources 110 may be a shared public repository of information or a proprietary repository of information that is not available to the public. For example, a publicly available data source is the U.S. National Vulnerability Database (NVD) 210. The NVD 210 is based on the CVE List 220 maintained by the MITRE Corporation, another publicly available data source. Other publicly data sources include VirusTotal Samples and Reports 230 and online discussions 240 including those on social media and discussion forums. Other data sources 260 may also be considered, along with proprietary data sources 250. Each of the data sources 210, 220, 230, 240, 250, 260 shown in FIG. 2 are merely examples and do not limit the number of type of data sources which may be considered by the method 100 described. A common characteristic of the data sources 210, 220, 230, 240, 250, 260 is that they rely on a common identifier associating information with a particular vulnerability.

One such common identifier is the CVE identifier included in the CVE List 220 which serves a list or dictionary of CVE identifiers for publicly disclosed vulnerabilities. Some other lists, such as the U.S. National Vulnerability Database (NVD) 210, build upon the information contained in the CVE List 220. The NVD 210, for example, augments the CVE List 220 with fix information, severity scores, impact ratings, vendors and products affected by the vulnerability, versions of the products being affected, and other information.

Some entities create other types of tools addressing different aspects of cybersecurity, but nevertheless make reference to CVE identifiers. VirusTotal, for example, provides a service for analyzing suspicious files and URLs, and for detecting viruses, worms, Trojans, and other kinds of malware. When previously characterized viruses, worms, Trojans, or other kinds of malware are detected, services like VirusTotal display the appropriate CVE identifier so that interested individuals can associate the specific malicious software with the vulnerability being used by the specific malicious software.

CVE identifiers are also often used by security professionals and other interested individuals when discussing exploitation of vulnerabilities either through malware or through the acts of malicious actors. These discussions may occur in private and public contexts such as security-focused forums, blogs, websites, and social media posts. These discussions, when public, may provide context as to whether a particular vulnerability is being exploited, and the frequency of exploitation of the vulnerability, for example. Additionally, entities providing cybersecurity services may have proprietary data describing how often their customers encounter certain vulnerabilities. Other entities that largely conduct their operations online may also have internal information regarding the frequency and type of vulnerabilities encountered. Such proprietary data also includes CVE identifiers so that the proprietary data may be associated with updated or revised information associated with the specific vulnerability.

As is clear from the above description, the CVE identifier serves the purpose of providing a common identifier for the specific vulnerability being described, and also serves as a convenient means of identifying information relevant to the vulnerability. The predictive engine 160 described here relies on this common identifier to associate information about the vulnerability collected from multiple disparate sources 110 in a manner that is more easily considered by the machine learning, statistical, and other predictive models used. In each of the data sources 210, 220, 230, 240, 250, 260 used by the method 100, common identifiers are used to identify the vulnerabilities associated.

When considering a plurality of data sources 110 as shown in FIG. 2, the data processor 120 collects information each of the data sources 210, 220, 230, 240, 250, 260 and utilizes the common identifier to identify information related to a specific vulnerability. In the depicted embodiment, information is gathered from the National Vulnerability Database 210, the MITRE CVE List 220, samples and reports from VirusTotal 230, online discussions 240, proprietary data sources 250, along with other data sources 260. The information from the data sources 110 may be accessed by the data processor 120 through application programming interface (API) calls, web page scraping, periodic database imports, or other known techniques. The information may be periodically obtained in a bulk fashion, or as information is introduced into the data sources 110. For example, the information from the NVD 210 may be obtained on a monthly basis, and the information from the MITRE CVE List 220 may be obtained as additional information is introduced into the list. Regardless of the particular technique used to obtain the threat information from a data source 110, during data processing 120 the various types of information are correlated with each other through the use of the common identifier available in the information from the data sources 110.

Although CVE identifiers have been described in detail, other common identifiers may be employed so long as the information from the data sources 110 can be associated with the vulnerability. Such common identifiers may include universally unique identifiers or other values that uniquely identify the particular vulnerability described in the data sources 110. In some embodiments, another standard common identifier may be used to supplement information. For example, certain vendors also maintain their own identifiers for vulnerabilities in their products. Such a vendor identifier may be used in conjunction with the CVE identifier and other common identifiers so that information relevant to the vulnerability is considered by the method 100 described here.

As an example, FIG. 3 is a depiction of a vulnerability listing from the NVD for CVE 2016-3963. Included with this example are an overview, listing of the impacts, and references to advisories, solutions or tools. This depiction of information should not be considered to limit the types of data available to the data processor 120 contemplated here.

Data Processor

The data processor 120 takes the information from the data sources 110 to create a combined data set 123 of historical vulnerability information. The data processor 120 also generates processed current vulnerability information 125 from the information from the data sources 110. The combined data set 123 and the processed current vulnerability information 125 are formatted by the data processor 120 in a manner that facilitates processing by the predictive models 531, 532, 533, 534 being employed in the method 100 described here. In some embodiments, the combined data set 123 and the processed current vulnerability information 125 consistent information that is aggregated from the data sources 110. In other embodiments, certain information may be derived from the data sources 110 for use in the combined data set 123 and the processed current vulnerability information 125. For example, more current information that may be found in online discussions 240 and proprietary data sources 250 may be favored for creating processed current vulnerability information 125.

Figure 4:
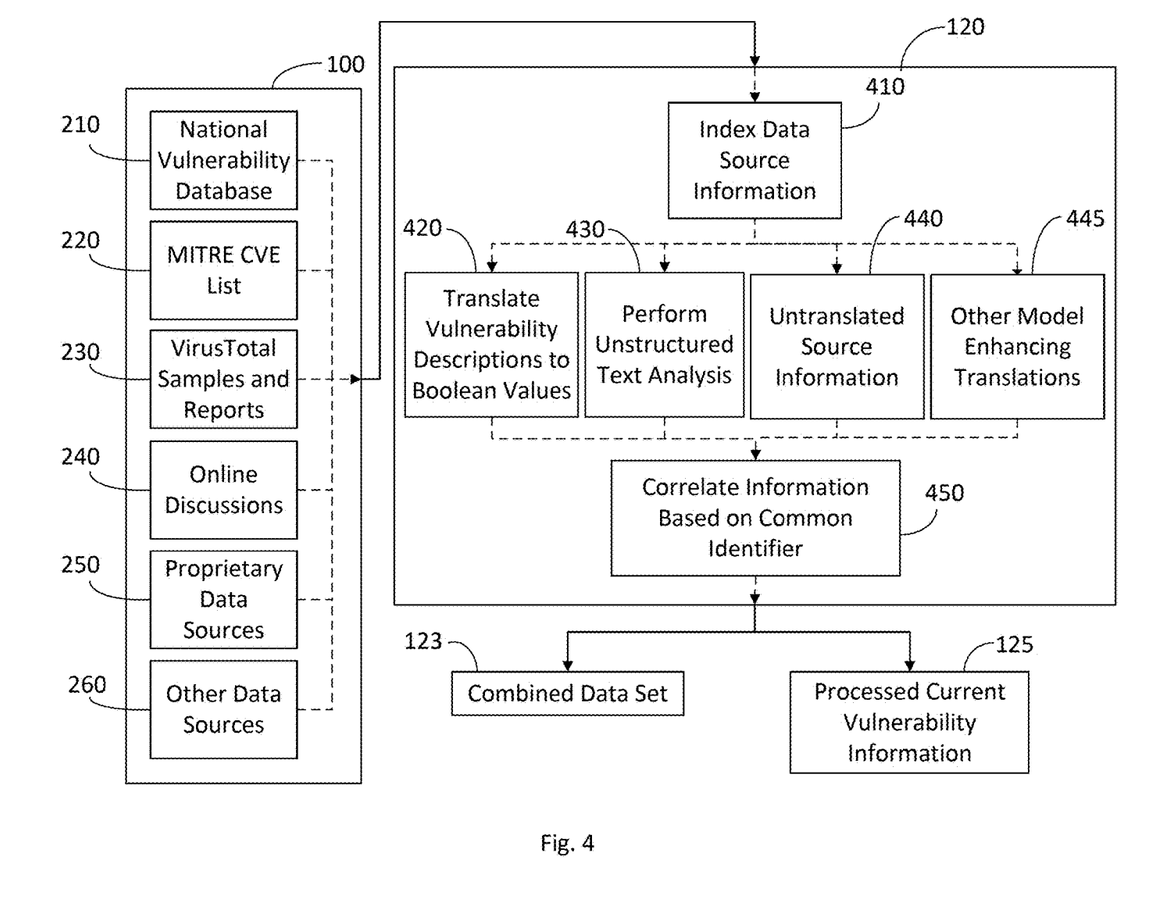
FIG. 4 depicts the preparation of a combined data set from the data sources.

Two specific types of processing are depicted in the embodiment of the data processor 120 shown in FIG. 4. Embodiments of the data processor 120 may employ other techniques not specifically described here to take the information from the data sources 110 and provide it in a manner suitable for the prediction engine 160.

First, as shown in FIG. 4, information from a plurality of data sources 110 is indexed 410 by the data processor 120. After indexing 410, the information from the data sources 110 has not yet been modified or transformed in a manner that facilitates modeling or predictive analysis. Instead, the information is arranged in a manner that facilitates further processing. Embodiments of the method 100 described here need not consider each and every portion of vulnerability information obtained from the data sources 110. For example, some embodiments may not consider the "CVSS v2 Base Score" shown in FIG. 3 because of the presence of the "CVSS v3 Base Score" in the information obtained from the NVD 210.

After indexing 410, certain vulnerability descriptions are transformed to facilitate further processing by the predictive models 531, 532, 533, 534. Transforming certain vulnerability descriptions into Boolean values 420 is one type of a transformation where certain descriptions having a predefined range of possible values are converted into corresponding formats. For example, in the example vulnerability entry from the NVD 210 shown in FIG. 3, information such as whether privileges are required, user interaction is required, and the complexity of the attack are included as values with defined values that can be converted into the appropriate corresponding format. Where possible and appropriate, the data values are converted into Boolean values 420. Where other information is defined by a set of possible values that do not conform to the true/false nature of Boolean values, e.g., low, medium, high, the other information is converted to a data type representing these defined possible values. For example, the other information may be transformed into a threat level enumeration that can represent values such as low, medium, and high.

When other types of information are included in the data sources 110 such as the date a vulnerability was released, some embodiments of the described method 100 convert the information into a continuous variable. Continuous variables can take on any value between a minimum and a maximum value. Such a conversion results in the information being placed on a constant scale so that the predictive models 531, 532, 533, 534 need not consider the actual calendar dates and account for regional localizations that may exist in the information. Other embodiments may consider both the "CVSS v2 Base Score" and the "CVSS v3 Base Score" to derive a value that represents the information from both data fields.

Additionally, unstructured text analysis 430 is performed on certain portions of the vulnerability information so that features may be derived. Entries in the example depicted in FIG. 3 that may undergo unstructured text analysis 430 may include, for example, the "Overview." Certain other data sources 100 may include mostly unstructured text from which interpretable features must be derived. For example, online discussions 240 may include forum posts formed substantially of unstructured text. Such information may be considered to determine if, for example, a vulnerability is being actively used, or if a vulnerability is being employed in combination with other vulnerabilities. At least some of this unstructured text is analyzed 430 to facilitate consideration by the predictive models 531, 532, 533, 534. In some embodiments, the unstructured text may be processed by generative statistical models such as latent Dirichlet allocation (LDA) which allows for sets of observations to be explained by unobserved groups which explain why certain aspects of the data are similar. These statistical models can determine the relationships between topics contained in the unstructured text in a manner that may be considered by the prediction models 531, 532, 533, 534. Other types of unstructured text analysis are possible such as sentiment analysis so that subjective information regarding vulnerabilities may be obtained and considered by the predictive models 531, 532, 533, 534.

Some portions of the vulnerability information may already be in a form that needs no adjustment, modification, or transformation. Entries in the example depicted in FIG. 3 that may not require any adjustment, modification, or transformation include the "Hyperlink" to the advisory. This information is already in a form that is acceptable for further processing by the predictive models 531, 532, 533, 534. With some examples of this information, no benefit is achieved if this untranslated source information 440 were to be further processed. Thus, in the embodiment of the data processor 120 shown in FIG. 4 the untranslated source information 440 is separated from information that is translated to Boolean values 420 and from information upon which unstructured text analysis 430 is performed.

In an effort to enhance predictions, some embodiments such as the one depicted in FIG. 4 may also use other types of transformations that are found to be improve the results. When, for example, it is found that predictions are improved when certain portions of the vulnerability information are transformed by simple averaging, rounding, approximation, or other techniques that are not specifically described regarding other transformations 420, 430, 440, such other transformations are applied to the vulnerability information to improve the predictions being generated. FIG. 4 depicts an embodiment with such additional improving transformations 445 being applied to the vulnerability information.

The above descriptions of the techniques used to process information from data sources 110 are merely examples and should not be considered to be an exhaustive list of the contemplated techniques.

After the techniques (420, 430, 440) used to process information from the data sources 110 are completed, the results are correlated based on the common identifier 450. For example, in at least one embodiment the results of the processing of the information for each vulnerability obtained from the data sources 110 are correlated based on the CVE identifier for the vulnerability obtained from the CVE List 220. In this example, the CVE identifier serves as the common identifier so each of the data sources 110 in this example provide information about vulnerabilities that may be associated with the CVE identifier, and the result of the processing (420, 430, 440) is correlated based on the CVE identifier.

After the information is correlated 450, either combined data set 123 or processed current vulnerability information 125 is generated. Regarding of the output (123,125) obtained from the data processor 120, the depicted embodiment of the data processor 120 employs the same techniques (420, 430, 440) to prepare the information for the prediction models 531, 532, 533, 534. In some embodiments, different processing techniques may be employed to prepare the information depending on whether the combined data set 123 or the processed current vulnerability information is being generated by the data processor 120.

Other types of information may also be incorporated in the combined data set 123 and the processed current vulnerability information 125 such as any weights or biases associated with the data sources 110. For example, the combined data set 123 may include a higher weight for information obtained from the NVD 210 than information obtained from online discussions 240. The weights associated with each data source 110 may be predetermined, or may be adjusted to help improve the accuracy of the prediction engine 160. The weights may be used to, for example, place greater emphasis regarding information that reflects whether or not a vulnerability is being actively used over information that reflects the perception of the vulnerability by individuals in the security community. Such a weighing may be particularly useful to increase the ability of the prediction engine 160 to provide true positives at the expense of increasing false positives. Conversely, by adjusting the weighing of the data sources, the prediction engine 160 may reduce the number of true positives while also decreasing the number of false positives.

In some embodiments, the weights associated with each data source may be included in the combined data set 123 and the processed current vulnerability information 125 in a manner that does not modify the original information obtained from the data sources 110. Such an embodiment is useful when the ability to process the original data is desirable. In other embodiments, the information in the combined data set 123 and the processed current vulnerability information 125 has values that are modified by the specific weights associated with a particular data source 110. Such an embodiment is useful when the original data need not be considered and when other considerations, such as performance, are more critical. In certain embodiments, the combined data set 123 and the processed current vulnerability information 125 may include some information from data sources 110 modified by the specific weights along with some information from data sources 110 that are not modified by the specific weights.

In some embodiments, the data processor 120 may vary its processing of the data sources 110 based on the data source, or based on the data being obtained from the data source 110. For example, certain embodiments may include a data processor 120 with a rule that skips unstructured text analysis 430 when the data is obtained from forum posts. In another embodiment, the data processor 120 includes a rule where only the unstructured text analysis 240 is performed on social media posts. In another embodiment, a data processor 120 may include a rule where descriptions from a proprietary data source 250 are only translated to Boolean values 420.

Retraining of the Prediction Engine to Generate a Prediction Ensemble

The prediction engine 160 employs a prediction ensemble 155 to generate the predictions. The prediction ensemble 155 defines a flexible structure of the predictive models 531, 532, 533, 534 available for use by the prediction engine 160. After the combined data set 123 is generated, the historical information of the combined data set 123 is utilized to retrain 140 and generate a new prediction ensemble 155. This retraining using the combined data set 123 may happen periodically. For example, the prediction engine 160 may be retrained once every week, once every three days, or any other appropriate time interval. In other embodiments, the prediction engine 160 may be retrained once a certain amount of information has been processed by the data processor 120. By combining the predictive models 531, 532, 533, 534 in a prediction ensemble 155, the various strengths and weaknesses of the models 531, 532, 533, 534 may be balanced so that a more useful prediction 170 is provided. The ensemble 155 is particularly useful when a variety of predictive models 531, 532, 533, 534 are employed that utilize differing strategies. This provides a difference in population, hypothesis, and modeling technique used by the predictive models 531, 532, 533, 534, among other factors. For example, when a tree-based model 531, a statistical model 532, a binary regression model 533, and other models relying on other algorithms 534, a prediction ensemble 155 is desirable.

When retraining, a previous prediction ensemble 150 is used as a starting prediction ensemble. If a previous prediction ensemble 150 is not available, a default ensemble may be used. When retraining, it is possible to introduce a modeling scheme 130 for consideration. The modeling scheme 130 includes adjustments or biases for consideration when retraining. The values included in the modeling scheme 130 may be configured to tailor the predictions 170 in a manner that provides a more useful prediction 170. The adjustments and biases included with the modeling scheme 130 may include a weighted average that favors certain models over others, a stacking of the models that utilizes predictions of multiple algorithms, or other combinations that emphasize the desirable aspects of each of the models being used in the ensemble. The adjustments and biases included with the modeling scheme 130 may also be used to emphasize certain aspects of certain models so that, for example, a higher true positive rate may be achieved while reducing the rate of false positives. In other embodiments, the modeling scheme 130 may be used to increase the sensitivity of the models, increasing the rate of false positives but also reducing the likelihood the prediction engine 160 fails to provide an appropriate threat level for a particular vulnerability. Other modifications to the modeling scheme 130 to achieve the desired results are contemplated but not specifically described here.

Figure 5:
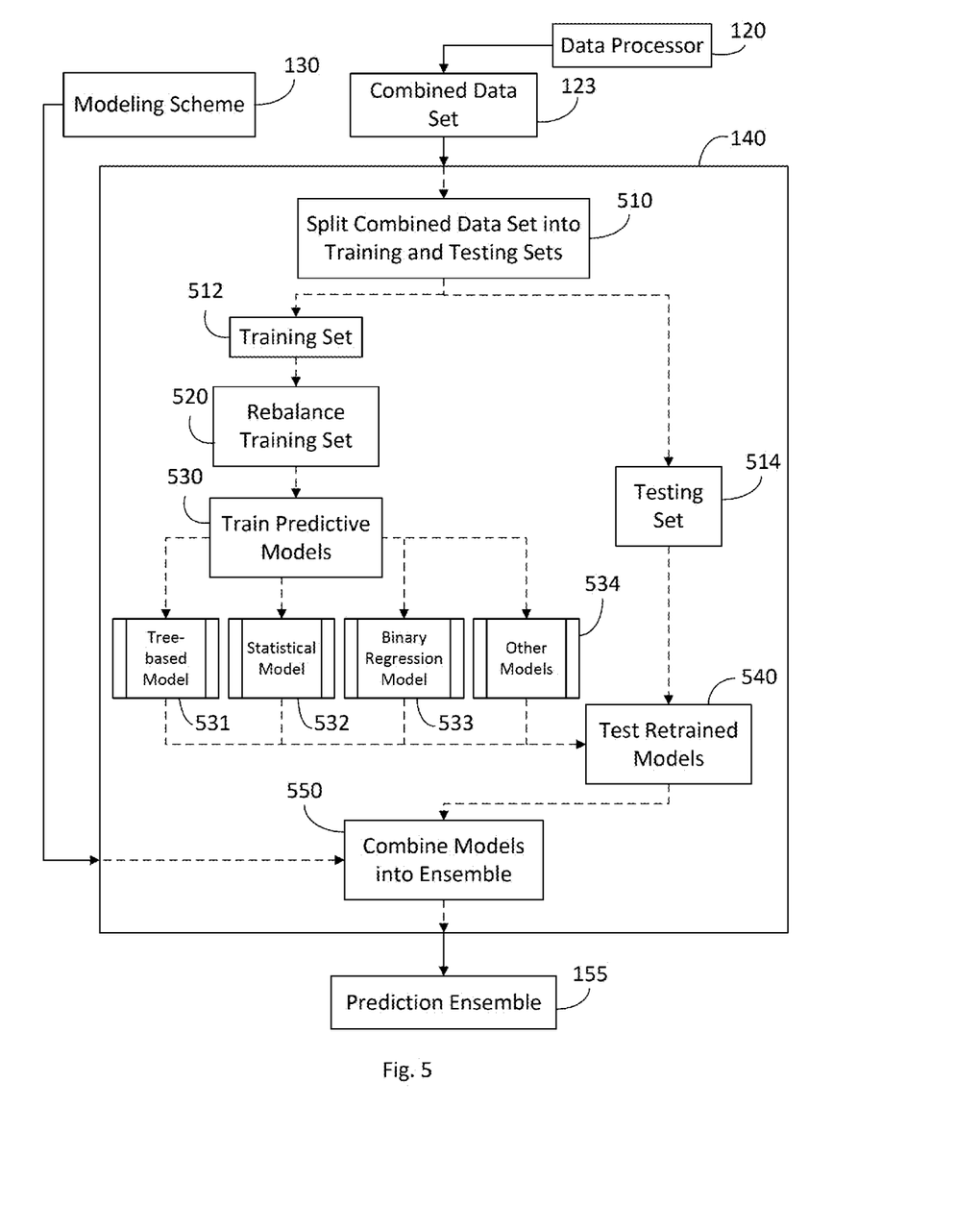
FIG. 5 depicts the process of retraining of the prediction engine and the creation of a prediction ensemble.

When retraining 140, the combined data set 123 is received from the data processor 120. At least a portion of the combined data set 123 is relied upon for retraining 140. As shown in FIG. 5, the method 100 depicted here splits the combined data set into training and testing sets 510. One such split of the combined data set 123 may separate information for which impacts are known from information for which impacts are not quantified.

Accordingly, the embodiment shown in FIG. 5 splits the combined data set 510 so that a training set 512 may be generated. The training set 512 may be, in some instances, a relatively small data set or an imbalanced data set. A data set may be imbalanced when, for example, the number of abnormal or interesting data points are small relative to the number of normal data points. In such instances, the training set is rebalanced 520 using techniques such as resampling, over sampling or under sampling, synthetic minority over-sampling, and random minority over-sampling. Other over-sampling techniques may be used to rebalance the training data set 512. The rebalanced training data 512 is then used to train the predictive models 530. Each of the predictive models 531, 532, 533, 534 considers the information in the training set 512 and is trained.

The portion of the combined data set 510 not being used in the training set 512 is used as the testing set 514. A testing set 514 may be formed of information for which the impacts of certain vulnerabilities are known, so an actual threat level is derived from such impacts. Such a testing set 514 may then be used to test 540 the retrained predictive models 531, 532, 533, 534 so that the models 531, 532, 533, 534 may be combined 550 into a prediction ensemble 550. The testing of the retrained models 540 against the testing set 514 verifies the predictive models 531, 532, 533, 534 are performing properly. In some embodiments, the performance of the predictive models 531, 532, 533, 534 against the training set 514 may be considered when combining the models into an ensemble 550.

In the embodiment depicted in FIG. 5, a modeling scheme 130 is considered when combining 550 the predictive models 531, 532, 533, 534 into a predictive ensemble 550. The predictive ensemble 550 is created after the predictive models 531, 532, 533, 534 have been tested against the testing set 514 so that their performance can be verified. By combining the predictive models 531, 532, 533, 534 into an ensemble, a more robust prediction may be obtained than if each of the predictive models 531, 532, 533, 534 considered the information individually. This is particularly true when the predictive models 531, 532, 533, 534 being used rely on diverse techniques. In addition to generating a more robust prediction, the use of a prediction ensemble 155 also helps improve the stability of the prediction 170. A variety of techniques may be used to create the ensemble 155. For example, the predictive models 531, 532, 533, 534 may be combined 550 using average or majority voting, gradient boosting, stacking, weighing, or other techniques.

The Prediction Engine

Figure 6:
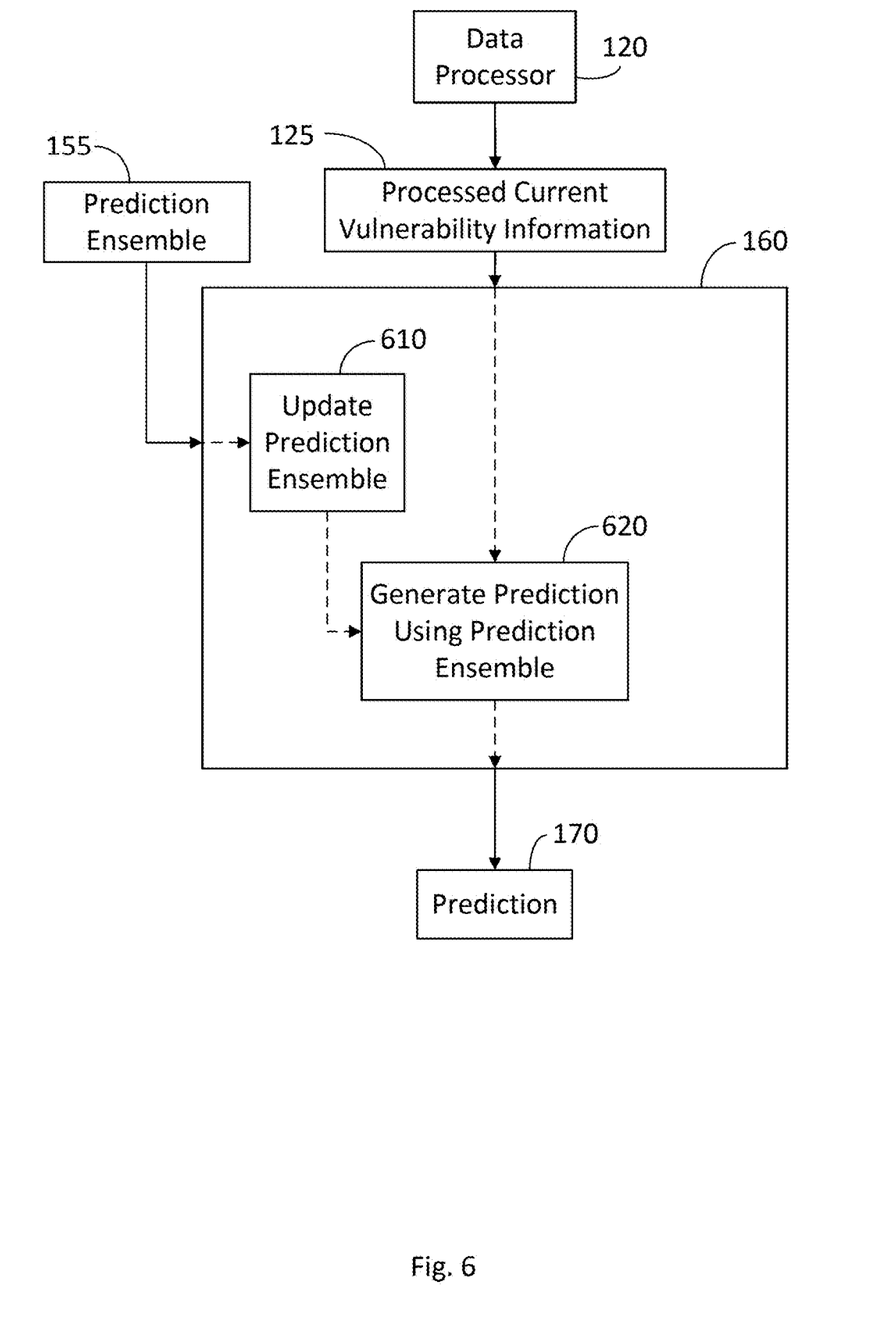
FIG. 6 depicts the prediction engine utilizing the prediction ensemble to generate a prediction.

The prediction engine 160 generates a prediction based on processed current vulnerability information 125 that is obtained from a data processor 120, and a prediction ensemble 155. As discussed, the data processor 120 can generate both a combined data set 123 and processed current vulnerability information 125 using the same techniques (420, 430, 440). Instead of historical information, the processed current vulnerability information 125 contains vulnerability information about a threat that is newly discovered or currently spreading through computer networks. The processed current vulnerability information 125 may comprise information from data sources 100 that include more current information such as online discussions 240 and proprietary data sources 250. Data sources 100 with this type of current information may, however, have a bias that differs from data sources 100 with more historical information, so the processed current vulnerability information 125 may include adjustments that minimize such biases.

When generating the prediction, the prediction engine 160 receives a prediction ensemble 155 and updates the prediction ensemble to be used 610. In some embodiments, the prediction engine 160 may update the prediction ensemble to be used 610 only as needed, i.e., when the received prediction ensemble 155 differs from a prediction ensemble stored in the prediction engine 160. The prediction engine 160 then executes the predictive models 531, 532, 533, 534 in accordance with the prediction ensemble 155 to generate a prediction 170 based on the processed current vulnerability information. The generated prediction 170 provides a representation of the likelihood of the current vulnerability will exploited by malicious actors against a particular computer network.

This generated prediction 170 may then be converted into a threat level that is easier for a computer administrator to evaluate, for example. In other situations, the generated prediction 170 may be used, without further conversion, as an input for further consideration by other systems. When the generated prediction 170 is to be converted into a threat level, the thresholds defining each threat level may be predefined by the computer administrator.

Computer System Architecture

Figure 7:
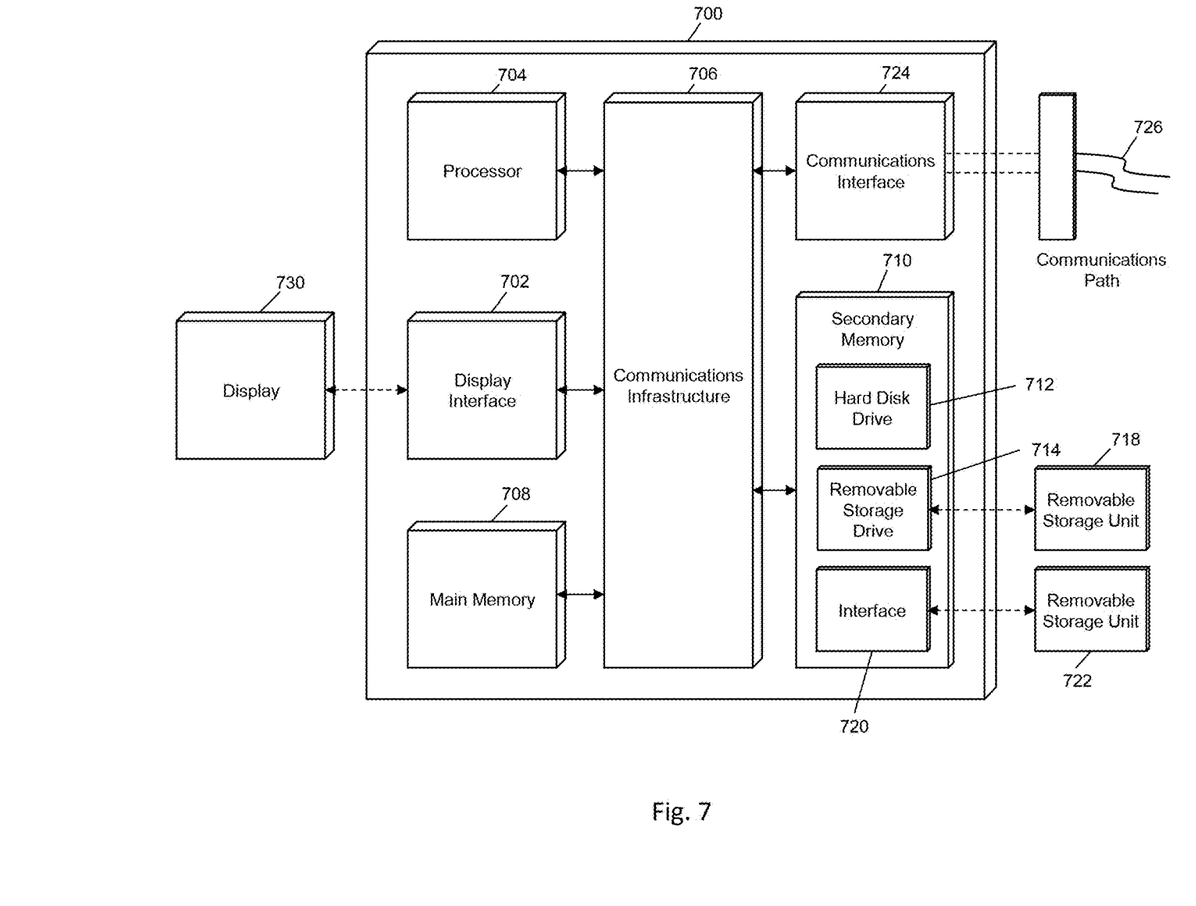
FIG. 7 depicts one embodiment of a computer system.

FIG. 7 illustrates a computer system 700 in which embodiments of the present disclosure, or portions thereof, may be implemented as computer-readable code. For example, the method 100 of FIG. 1 may be implemented in the computer system 700 using hardware, software, firmware, and/or non-transitory computer readable media having instructions for performing the tasks describe for the method 100. Hardware, software, or any combination thereof may also embody the various modules 120, 140, 160 included in this disclosure, and the sub-modules 410. 420. 430. 440. 450. 510, 520, 530, 531, 532, 533, 534, 540, 550, 610, 620 included in this disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

The terms "computer program medium," "non-transitory computer readable medium," and "computer usable medium" as discussed herein are used to generally refer to tangible media such as a removable storage unit 718, a removable storage unit 722, and a hard disk drive 712. The computer system 700 may also include a main memory 708 (e.g., random access memory, read-only memory, etc.), and may also include a secondary memory 710. The secondary memory 710 may include the hard disk drive 712 and a removable storage drive 714 (e.g., a floppy disk drive, a magnetic tape drive, an optical disk drive, a flash memory, etc.).

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art. The secondary memory 710 may also include an array of such means, such as an array of hard disk drives, flash memory, etc.

A processor unit or device 704 as discussed herein may be a single processor, a plurality of processors, or combinations thereof. Processor devices may have one or more processor cores. Processor device 704 may be a special purpose or a general purpose processor device specifically configured to perform the functions discussed herein. The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

The processor device 704 may be connected to a physical communications infrastructure 706 that transmits communications. The physical communications infrastructure 706 allows for a bus, message queue, network, multi-core message-passing scheme, etc. to be implemented so that reliable transfer of messages and/or information with other components is possible.

Data stored in the computer system 700 (e.g., in the main memory 708 and/or the secondary memory 710) may be stored on any type of suitable computer readable media, such as optical storage (e.g., a compact disc, digital versatile disc (DVD), Blu-ray disc, etc.), solid state media (e.g., memory cards, flash drives, etc.), magnetic tape storage, hard disk drives, or other suitable media. The data may be configured in any type of suitable configuration, such as a database, flat file, etc. Suitable configurations and storage types will be apparent to persons having skill in the relevant art.

The computer system 700 may also include a physical communications interface 724. The communications interface 724 provides the physical link that allows software and data to be transferred between the computer system 700 and external devices. A network is established over this physical communications interface 724 and may be any type of network suitable for performing the functions as disclosed herein including a wired or wireless local area network (LAN), a wired or wireless wide area network (WAN), a mobile communication network, a satellite network, the Internet, fiber optic, coaxial cable, infrared, radio frequency (RF), or any combination thereof. Other suitable network types and configurations will be apparent to persons having skill in the relevant art.

Exemplary communications interface 724 may include a modem, an Ethernet network interface, a fiber optic communications port, a Wi-Fi-compliant antenna, a Bluetooth interface, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, electronic ink, etc.

Computer program medium and computer usable medium may refer to memories, such as the main memory 708 and secondary memory 710, which may be memory semiconductors. These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Example Usage of the Described Method

One example usage of the method 100 disclosed herein is now provided. Prior to considering a current vulnerability, a computer administrator for a computer network defines certain thresholds for threat levels that are to be derived from a prediction generated by the method 100. Also prior to considering a current vulnerability, a prediction ensemble 155 is created for use by the prediction engine 160 of the method 100 described here. A plurality of data sources 110 are collected where the data sources 110 each provide information about vulnerabilities. Each of the data sources 110 use a common identifier to attribute the information to a particular vulnerability. Using the common identifier, the method 100 can correlate all vulnerability information for a particular vulnerability across the plurality of data sources 110.

The method 100 is implemented on the computer system 700 so that instructions performing the described tasks are executed by computer hardware configured by the programming describing the instructions. The information from the data sources 110 is obtained across a physical communications interface 724. The information is obtained from publicly available APIs or extracted using scraping or other known information extraction techniques. The data processor 120 which executes on processor device 704 processes the information so that a combined data set 123 of historical vulnerability information is obtained. A prediction engine retrainer 140 takes the combined data set 123 and a modeling scheme 130 containing manual adjustments created by a computer administrator, along with a previously used prediction ensemble 150, to obtain a retrained prediction ensemble 155. The previously used prediction ensemble 150 may be obtained from the main memory 708 associated with the prediction engine 160. The retrained prediction ensemble 155 is stored in secondary memory 710 until needed by the prediction engine 160.

At an appropriate time, information regarding a current vulnerability is introduced to the method 100 implemented on the computer system 700. The current vulnerability may be newly discovered, newly relied upon by malicious actors, or the like. The computer administrator for a computer network described above is interested in understanding the threat level associated with the current vulnerability so that the computer administrator's computer network is more properly protected. The method 100 considers the current vulnerability information from the data sources 110 by executing the same processes used on the combined data set 123 on the current vulnerability information to derive processed current vulnerability information 125. The processed current vulnerability information is considered by the prediction engine 160. The prediction engine 160, prior to generating a prediction 170, retrieves the latest retrained prediction ensemble 155 from secondary memory 710 so that a more optimal prediction may be obtained. The prediction engine 160 executes the prediction ensemble 155 so that the various prediction models 531, 532, 533, 534 can offer their individual evaluations of the current vulnerability information. The result of the execution of the prediction ensemble 155 is a prediction 170. This prediction 170 is a value that is within at least one of the thresholds previously defined by the computer administrator. Based on the thresholds, the computer administrator of the computer network is informed as to the threat level posed by the current vulnerability, and may undertake appropriate remediation.

Techniques consistent with the present disclosure provide, among other features, systems and methods for identification of pre-approved products in a limited use account. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing a threat level based on a prediction of a likelihood that a current vulnerability is employed in a customer computer network, the method comprising:
retrieving a prediction ensemble previously used by a prediction engine the prediction ensemble defining a combination of a plurality of prediction models and adjustments to be used by the prediction engine
retraining the prediction ensemble previously used by the prediction engine the retraining evaluating a combined data set of historical vulnerability information and a modeling scheme (130) to generate a revised prediction ensemble based on a plurality of prediction models;
retrieving current vulnerability information describing a current vulnerability from the plurality of data sources;
processing the current vulnerability information describing the current vulnerability for use by the prediction engine;
generating, using the prediction engine, a prediction based on the revised prediction ensemble and the processed current vulnerability information, the prediction identifying the likelihood that the current vulnerability is employed in a customer computer network;
providing to an administrator of the customer computer network the threat level based on the prediction of the likelihood the current vulnerability is employed in the customer computer network, the threat level being based on predetermined thresholds defined by the administrator of the customer computer network;
translating vulnerability descriptions from the historical vulnerability information to defined values;
performing textual analysis to extract additional information from the historical vulnerability information;
correlating the defined values, the additional information, and untranslated source information, and
generating the combined data set based on the correlated defined values, the additional information, and the untranslated source information of the historical vulnerability information.

2. The method of claim 1, comprising:
retrieving the historical vulnerability information from a plurality of data sources; and
indexing the historical vulnerability information.

3. The method of claim 2, wherein the processing of the current vulnerability information describing the current vulnerability for use by the prediction engine comprises:
indexing the current vulnerability information;
translating vulnerability descriptions from the current vulnerability information into defined values;
performing textual analysis to extract additional information;
correlating the defined values, the additional information, and untranslated source information; and
generating the processed current vulnerability information based on the correlated defined values, additional information, and untranslated source information of the current vulnerability information.

4. The method of claim 1, wherein generating the revised prediction ensemble based on the plurality of prediction models comprises:
receiving a modeling scheme containing adjustments to an existing prediction ensemble; and
training the plurality of prediction models using a training set created from at least a portion of the combined data set and the modeling scheme to revise the prediction ensemble.

5. The method of claim 4, wherein the training of the plurality of predictive models using the training set created from the portion of the combined data set and the modeling scheme comprises:
splitting the combined data set into the training set and a testing set
running the plurality of predictive models against the training set to generate training predictions;
running the plurality of predictive models against the testing set to generate testing predictions; and
revising the prediction ensemble based on the generated training predictions and the generated testing predictions.

6. The method of claim 1, wherein the generation, using the prediction engine, of the prediction based on the revised prediction ensemble, and the processed current vulnerability information comprises:
updating the prediction engine to use the revised prediction ensemble; and
executing the prediction engine with the revised prediction ensemble (155) of the plurality of predictive models against the processed current vulnerability information to obtain the prediction.

7. The method of claim 3, wherein the historical vulnerability information from the plurality of data sources includes a common identifier for each vulnerability; wherein the generated combined data set is correlated using the common identifier; and wherein the processed current vulnerability information includes a common identifier for the current vulnerability.

8. The method of claim 1, wherein the retraining of the prediction engine occurs periodically to consider new historical vulnerability information retrieved from the plurality of data sources.

9. The method of claim 1, wherein the generated prediction is further based on a configuration of the customer computer network.

10. A system for providing a threat level based on a prediction of a likelihood that a current vulnerability is employed in a customer computer network, the system comprising:
a processor configured to generate and store in a data repository a combined data set of historical vulnerability information obtained from a plurality of data sources, wherein the processor is configured to translate vulnerability descriptions from the historical vulnerability information into defined values, perform textual analysis to extract additional information from the historical vulnerability information, correlate the defined values, the additional information, and untranslated source information, and generate the combined data set based on the correlated defined values, the additional information, and the untranslated source information;

a retraining server configured to retrain a prediction ensemble previously used for execution by a prediction engine, the retraining evaluating the combined data set and a received modeling scheme to generate a revised prediction ensemble based on a plurality of prediction models;

wherein the prediction ensemble defines a combination of the plurality of prediction models and adjustments to be used by the prediction engine;

the data repository retrieving, from a plurality of data sources, current vulnerability information describing a current vulnerability; the data repository processing the current vulnerability information describing the current vulnerability for use by the prediction engine; and a prediction engine execution server configured to generate a prediction using the prediction engine, the prediction being based on the revised prediction ensemble and the processed current vulnerability information, the prediction providing the likelihood that the current vulnerability is employed in a customer computer network;

wherein the prediction engine execution server provides to an administrator of the customer computer network the threat level based on the prediction of the likelihood the current vulnerability is employed in the customer computer network, the threat level being based on predetermined thresholds defined by the administrator of the customer computer network.

11. The system of claim 10, wherein the processor is configured to:
retrieve the historical vulnerability information from the plurality of data sources; and
index the historical vulnerability information,
wherein the data repository transmits at least a portion of the combined data set to the retraining server.

12. The system of claim 11, wherein the data repository processes the current vulnerability information describing the current vulnerability for use by the prediction engine by:
retrieving the current vulnerability information from the plurality of data sources
indexing the current vulnerability information;
translating vulnerability descriptions from the current vulnerability information into defined values;
performing textual analysis to extract additional information from the historical vulnerability information;
correlating the defined values, the additional information, and untranslated source information; and
generating the processed data set based on the correlated defined values, additional information, and untranslated source information;
wherein the data repository transmits at least the processed current vulnerability information to the retraining server.

13. The system of claim 10, wherein the retraining server generates the revised prediction ensemble based on the plurality of prediction models by:
receiving a modeling scheme from a modeling server containing adjustments to an existing prediction ensemble stored in the retraining server;
training the plurality of prediction models at the retraining server using a training set created from at least a portion of the combined data set received from the data repository and the received modeling scheme to revise the stored prediction ensemble.

14. The system of claim 13, wherein the retraining server trains the plurality of predictive models using the training set created from the portion of the combined data set received from the data repository and the received modeling scheme by:
splitting the combined data set received from the data repository into the training set and a testing set
running the plurality of predictive models at the retraining server against the training set to generate training predictions;
running the plurality of predictive models at the retraining server against the testing set to generate testing predictions; and
revising the existing prediction ensemble stored on the retraining server based on the generated training predictions and the generated testing predictions.

15. The system of claim 10, wherein the prediction engine execution server, using the prediction engine executing at the prediction engine execution server, generates the prediction based on the revised prediction ensemble transmitted by the retraining server, and the processed current vulnerability information transmitted by the data repository by:
updating the prediction engine using the received revised prediction ensemble and
executing the prediction engine with the received revised prediction ensemble of the plurality of predictive models against the processed current vulnerability information to obtain the prediction.

16. The system of claim 12, wherein the historical vulnerability information from the plurality of data sources includes a common identifier for each vulnerability; wherein the generated combined data set is correlated using the common identifier; and wherein the processed current vulnerability information includes a common identifier for the current vulnerability.

17. The system of claim 10, wherein the retraining server retrains the prediction engine periodically to consider new historical vulnerability information retrieved from the plurality of data sources.

18. The system of claim 10, wherein the generated prediction is further based on a configuration of the customer computer network.

* * * * *